J. T. ROBINSON, G. E. GOODING AND D. J. RUSSO.
PAPER BOX MACHINE.
APPLICATION FILED FEB. 28, 1919.

1,392,969.

Patented Oct. 11, 1921.
2 SHEETS—SHEET 1.

INVENTORS:
John T. Robinson
George E. Gooding
Domenico J. Russo
by Macleod, Calver, Copeland & Dike
Attys.

J. T. ROBINSON, G. E. GOODING AND D. J. RUSSO.
PAPER BOX MACHINE.
APPLICATION FILED FEB. 28, 1919.
1,392,969.
Patented Oct. 11, 1921.
2 SHEETS—SHEET 2.
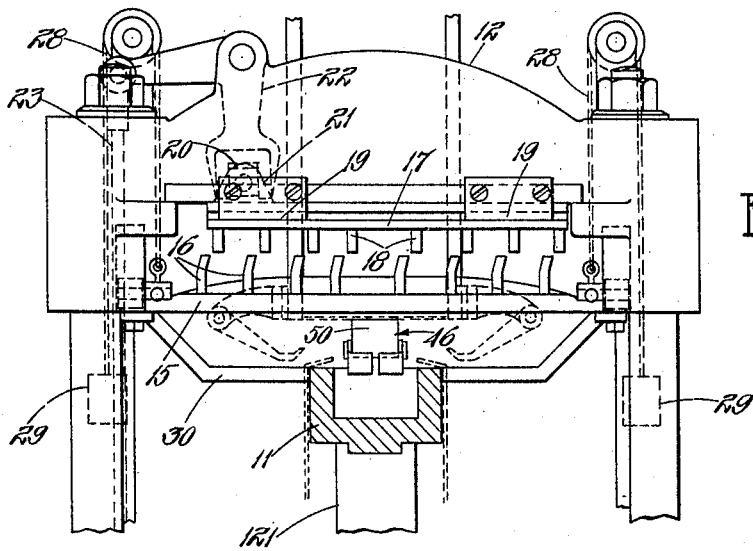
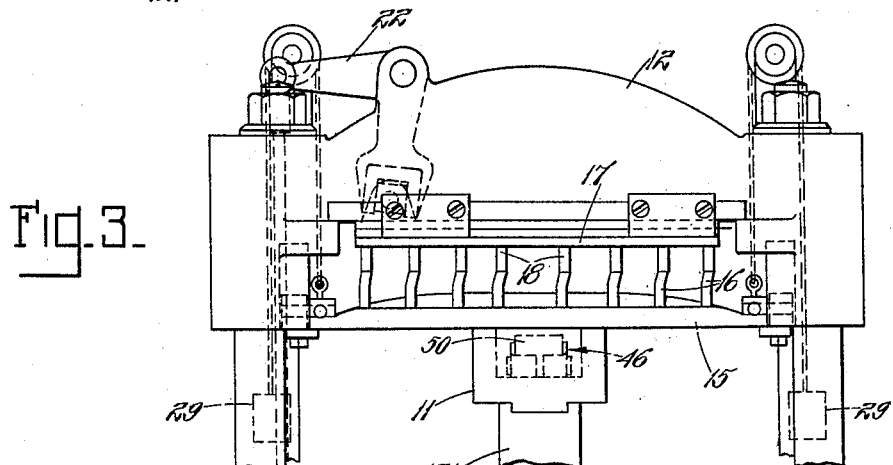
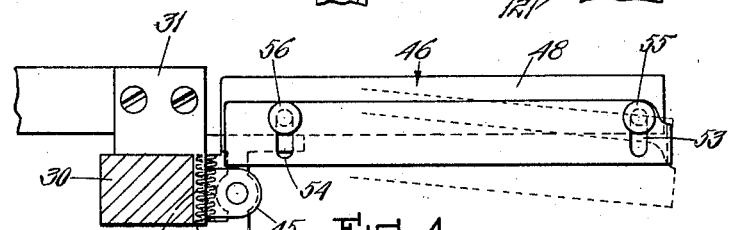
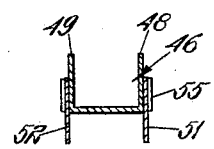
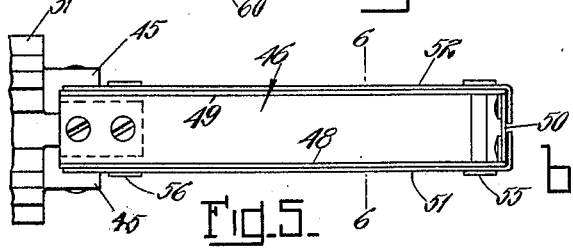
INVENTORS:
John J. Robinson
George E. Gooding
Domenico J. Russo
by Macleod, Calvey, Copeland & Detry
Attys.

UNITED STATES PATENT OFFICE.

JOHN T. ROBINSON, GEORGE E. GOODING, AND DOMENICO J. RUSSO, OF BOSTON, MASSACHUSETTS, ASSIGNORS TO JOHN T. ROBINSON COMPANY, OF BOSTON, MASSACHUSETTS, A CORPORATION OF MASSACHUSETTS.

PAPER-BOX MACHINE.

1,392,969.   Specification of Letters Patent.   Patented Oct. 11, 1921.

Application filed February 28, 1919. Serial No. 279,768.

*To all whom it may concern:*

Be it known that we, JOHN T. ROBINSON, GEORGE E. GOODING, and DOMENICO J. RUSSO, all citizens of the United States, residing at Boston, county of Suffolk, State of Massachusetts, have invented a certain new and useful Improvement in Paper-Box Machines, of which the following is a specification, reference being had therein to the accompanying drawings.

Our invention relates to paper box machines, and has to do especially with box-ending or end-setting machines and extension edge machines used in the manufacture of paper boxes. In these machines, blanks are automatically fed from a hopper and are secured to a body blank which is placed upon a form. The present invention has to do with safety mechanism in combination with a feeder which shall render it impossible for the operator to injure his fingers. We have found in the operation of these machines that there are two sources of danger. First, the operator is likely to have his fingers crushed between the box form and the fixed presser head, and second, he is likely to get his fingers crushed between the box form and the end blank feeder. Our invention, therefore, provides safety devices which make it impossible for the operator to injure his fingers either by being pinched between the box form and the fixed presser head or between the box form and the end blank feeder.

In the accompanying drawings, we have shown our invention as embodied in a box-ending machine since we have put it into use in a box-ending machine.

The invention will be fully understood from the following description when taken in connection with the accompanying drawings, and the novel features thereof will be pointed out and clearly defined in the claims at the close of this specification.

In the drawings, Figure 1 is a side elevation partly in section of the box-ending machine embodying our invention.

Fig. 2 is a front elevation of the upper part of the machine shown in Fig. 1, certain parts being shown in section for clearness of illustration. In this view, the parts are shown in the position which they occupy when the box form is at the lowest point in its movement.

Fig. 3 is a view similar to Fig. 2 but showing the box form in raised position.

Fig. 4 is a side elevation of the feeder-guard.

Fig. 5 is a top plan view of the feeder-guard.

Fig. 6 is a section on line 6—6 of Fig. 5.

Figure 1:
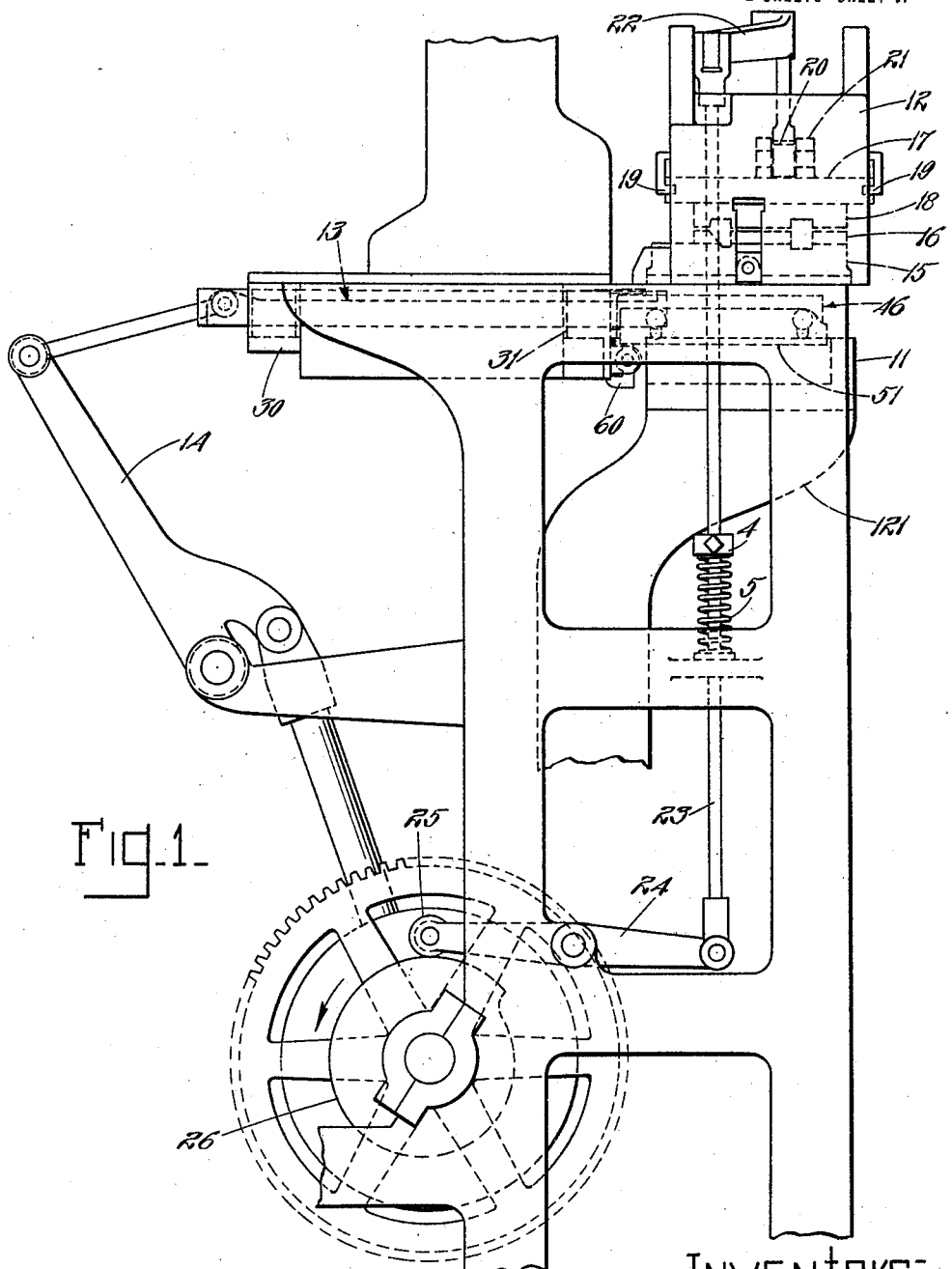

Referring to the drawings, at 11 is shown a hollow box form of a box-ending machine. The box form is open at the rear to permit the feeder to be projected forward into position to support the box end over the body blank without colliding with the walls of the box form. At 12 is shown the cross head or fixed press member. At 13 is shown the feeder which will be described in detail hereafter. The box form 11 is supported on a horn 121 which is caused to reciprocate in the manner well known to those skilled in the art. The feeder 13 is also reciprocated in time with the other working parts of the machine by means of a feeder-arm 14.

At 15 is shown a freely movable press member provided on its upper surface with a series of projections 16. At 17 is shown a slide movable transversely of the freely movable press member 15 and provided on its lower surface with projections 18 so located that they will register with the projections 16 on the freely movable press member. The slide or supporting member 17 is movable on ways 19 and has on its upper surface a block 20 pivoted between lugs 21. The block is engaged by a forked arm of a bell crank lever 22, the upper arm of which is connected to a rod 23, the lower end of which is pivotally connected to a cam lever 24 (see Fig. 1) provided with a cam roll 25 which is acted upon by a cam 26. The connecting rod 23 has a collar 4 against which rests a spring 5, the other end of which engages a fixed part of the machine. The cam is so timed and the parts are so constructed that they operate to move the supporting member or slide 17 out of engagement with the ends of the projections 16 and hold it in this position until the box form has risen to a point so nearly adjacent to the under surface of the freely movable press member 15 that there is not room to permit the operator's fingers to get between the box form and the press member. When this point is reached, the cam 26 permits the spring 5 to move the supporting member 17 into position with the projections 18 in registration with the projections 16. This fixes the position of the freely movable member 15 and renders it unyielding and capable of resisting the necessary pressure on the box form 11.

The freely movable press member 15 has attached to it flexible members 28 and counterweights 29 which nearly counterbalance the weight of the member 15. These counterbalances reduce the resistance of the freely movable member resulting from its inertia and eliminate the possibility of injury to the operator's fingers. This counterbalancing is not necessary in a small sized machine where the weight of the freely movable press member 15 is small.

The front end of the bracket 31 which is secured to a yoke 30 or other fixed part of the machine is provided with a pair of lugs 45 to which is hinged a guard 46 (see Figs. 4, 5 and 6). This guard 46 comprises a bottom and two side members 48 and 49 and a front member 50. The guard 46 is of a size and shape to receive the end of the feeder when it is projected forward into the hollow box form and lies within the box form when the form is raised. The upper edge of the guard is practically on a level with the upper edge of the feeder. On the sides and front of the guard are secured two aprons 51, 52 which are slotted as shown at 53, 54 for the reception of pins or rivets 55, 56 by which the aprons are movably secured to the sides of the guard. These aprons normally hang down from the guard with the upper ends of the slots resting on the pins or rivets 55, 56, but they are freely movable upwardly so that they will telescope about the feeder-guard when the box form moves up and they engage its inside bottom surface. The feeder-guard walls and the aprons extend down from about the level of the top edge of the feeder to a point below the top edge of the box form when the box form is in its lowest position and they surround the feeder on three sides.

The feeder-guard is provided with a lug 60 and a spring 61 so located that the feeder-guard may be depressed to the point indicated by the dotted lines in Fig. 4, and the spring will restore it to normal position when the pressure is released. This permits the operator to remove the completed box more easily, since the dropping of the front end of the feeder-guard permits the box to be swung off in the arc of a circle instead of being pulled out horizontally. This makes the work of the operator much easier, allowing him to manipulate the box with the motion to which he had been accustomed, and also does away with the danger of pulling off the box end from the inturned edges of the box body.

From the foregoing, it will be seen that the devices herein described provide ample protection for the operator so that his fingers cannot be crushed between the box form and the presser head or between the box form and the feeder. This results because the feeder-guard prevents the operator getting his fingers under the feeder when the box form is down. Also, if the operator's fingers are on top of the box form, the movable press member 15 will be raised and it will prevent the supporting member 17 being moved into position to back up the freely movable press member. On this account, the box form cannot exert sufficient pressure against the presser head to crush the operator's fingers.

What we claim is—

1. In a paper box machine, the combination of a movable hollow box form, a fixed head, a freely movable press member located between the box form and the head, a feeder capable of being projected into the space beneath the freely movable press member and within the box form, and mechanism operated by the actuating mechanism for the box form to secure the movable press member immovably to the fixed head when the box form has reached a predetermined point in its movement toward the fixed head.

2. In a paper box machine, the combination of a movable hollow box form, a fixed head, a freely movable press member located between the box form and the head, a supporting member between the press member and the head and adapted in one position to rest against the head and support the freely movable member against pressure exerted by the box form and in another position to permit free movement of the press member, a feeder capable of being projected into the space beneath the freely movable press member and within the box form, and mechanism operated by the actuating mechanism for the box form to move the said supporting member to supporting position between the movable press member and the fixed head when the box form has reached a pre-determined point in its movement toward the fixed head.

3. In a paper box machine, the combination of a movable hollow box form, a fixed head, a freely movable press member located between the box form and the head, a feeder capable of being projected into the space beneath the freely movable press member and within the box form, a guard surrounding the end of the feeder and located between the feeder and the inner wall of the box form when the feeder is in its forward position, and mechanism operated by the actuating mechanism for the box form to secure the movable press member immovably to the fixed head when the box form has reached a pre-determined point in its movement toward the fixed head.

4. In a paper box machine, the combination of a movable hollow box form, a fixed head, a freely movable press member located between the box form and the head, a feeder capable of being projected into the space beneath the freely movable press member and within the box form, a feeder guard surrounding the end of the feeder and located between the feeder and the inner wall of the box form when the feeder is in its forward position, secured to a fixed part of the machine, and mechanism operated by the actuating mechanism for the box form to secure the movable press member immovably to the fixed head when the box form has reached a pre-determined point in its movement toward the fixed head.

5. In a paper box machine, the combination of a movable hollow box form, a fixed head, a freely movable press member located between the box form and the head, a feeder capable of being projected into the space beneath the freely movable press member, a feeder guard secured to a fixed part of the machine, received within the box form when the box form is in its uppermost position and extending from a point adjacent the top edge of the feeder to a point at least as low as the top edge of the box form when in its lowest position, and mechanism operated by the actuating mechanism for the box form to secure the movable press member immovably to the fixed head when the box form has reached a pre-determined point in its movement toward the fixed head.

6. In a paper box machine, the combination of a movable hollow box form, a fixed head, a freely movable press member located between the box form and the head, a feeder capable of being projected into the space beneath the freely movable press member and within the box form, a feeder guard surrounding the feeder and located between the feeder and the inner wall of the box form when the feeder is in its forward position, said feeder guard being yieldable downwardly and mechanism operated by the actuating mechanism for the box form to secure the movable press member immovably to the fixed head when the box form has reached a pre-determined point in its movement toward the fixed head.

7. In a paper box machine, the combination of a movable hollow box form, a fixed head, a freely movable press member located between the box form and the head, a feeder capable of being projected into the space beneath the freely movable press member and within the box form, a feeder guard surrounding the end of the feeder and located between the feeder and the inner wall of the box form when the feeder is in its forward position, spring actuated hinge mountings holding the feeder guard normally with its upper edge adjacent the upper edge of the feeder and permitting it to yield downwardly when the box form is removed, and mechanism operated by the actuating mechanism for the box form to secure the movable press member immovably to the fixed head when the box form has reached a pre-determined point in its movement toward the fixed head.

8. In a paper box machine, the combination with a reciprocating hollow box form, a coöperating yieldable press member, means to render the press member unyielding when a pre-determined point in the movement of the box form has been reached, a feeder capable of being projected into the space beneath the yieldable press member, and a guard permanently located in a position to be received within the hollow box form when it is raised and between the feeder in its forward position and the inner wall of the box form.

9. In a paper box machine, the combination with a reciprocating hollow box form, a coöperating press member, a feeder capable of being projected into the space beneath the press member, a guard around the feeder when in its forward position, said guard being collapsible to permit it to be received within the box form when the box form is adjacent the press member.

10. In a paper box machine, the combination with a reciprocating hollow box form, a coöperating press member, a feeder capable of being projected into the space beneath the press member, a guard around the feeder when in its forward position, said guard being provided with downwardly extending members movable relatively to the said guard so that the guard and attached movable members may be received within the box form when the box form is moved to a position adjacent the press member.

11. In a paper box machine, the combination with a reciprocating hollow box form, a coöperating press member, a feeder capable of being projected into the space beneath the press member, a guard around the feeder when in its forward position, aprons extending downwardly from the said guard and movable vertically relative to the box form, said aprons in their lowest position having their bottom edges below the top edge of the box form and together with the guard being received within the box form when the box form is in its uppermost position.

12. In a paper box machine, the combination with a reciprocating box form, a coöperating press member, a feeder capable of being projected into the space beneath the press member, a guard around the feeder when in its forward position, slotted aprons secured to the sides of said guard, and pins on the guard coöperating with the slots in the aprons to permit the aprons to be moved parallel with the sides of the guard.

In testimony whereof we affix our signatures.

JOHN T. ROBINSON.
GEORGE E. GOODING.
DOMENICO J. RUSSO.